United States Patent Office 3,513,962
Patented May 26, 1970

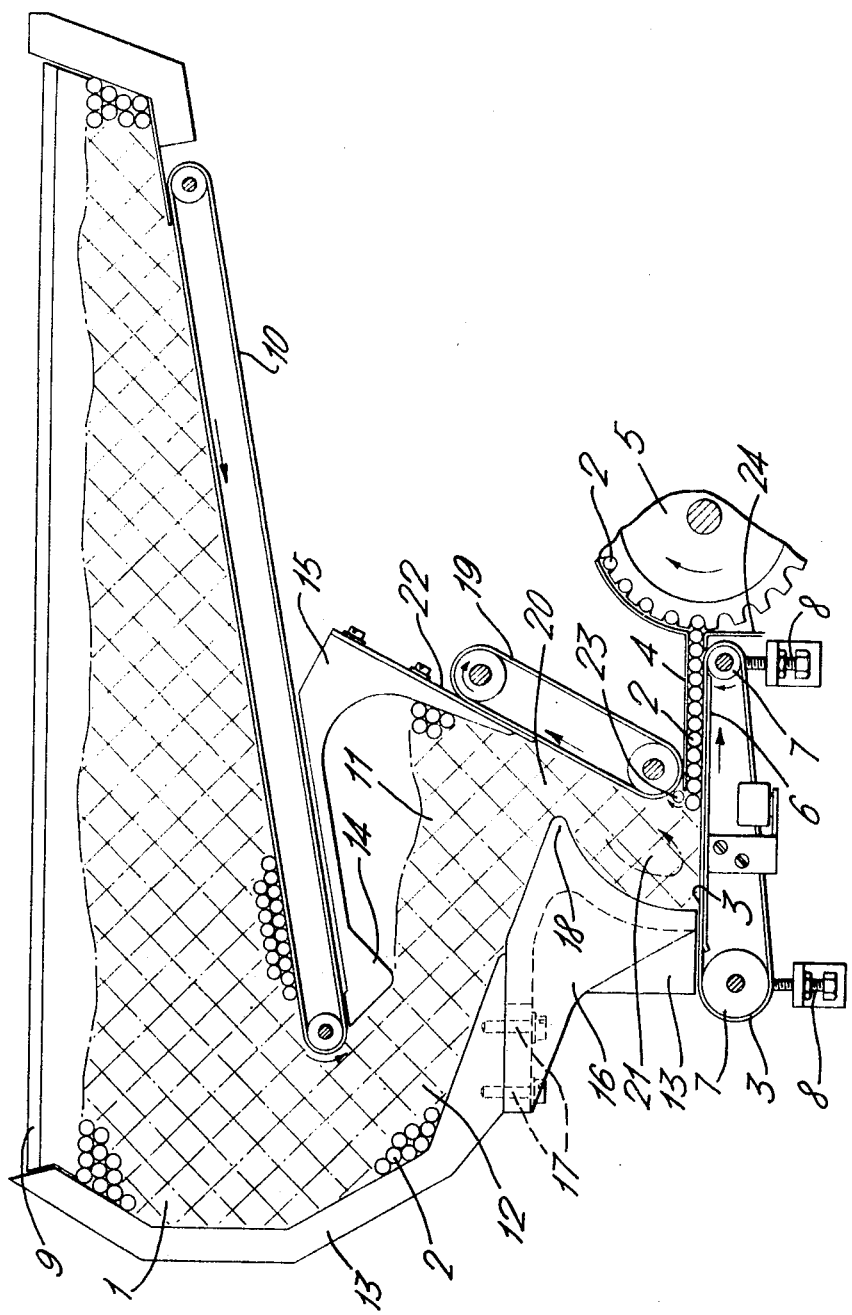

3,513,962
ARTICLE FEEDING APPARATUS
Horace Alexander Stone and William Charles London, London, England, assignors to Molins Machine Company Limited, Deptford, London, England, a corporation of Great Britain
Filed Mar. 12, 1968, Ser. No. 712,516
Claims priority, application Great Britain, Feb. 16, 1968, 7,766/68
Int. Cl. B65g 47/18
U.S. Cl. 198—57          10 Claims

ABSTRACT OF THE DISCLOSURE

Apparatus for feeding plugs being lengths of cigarette filter material from trays comprising a hopper into which the trays are unloaded and a fluted rotary drum wherein the plugs are fed from the bottom of the hopper to the fluted drum in a single stream which is positively urged by a supporting conveyor band to move them transversely to their lengths.

---

This invention is concerned with improvements in or relating to article feeding apparatus and is particularly, although not exclusively, concerned with apparatus for feeding multiple lengths of cigarette filter plug material to apparatus for manufacturing filter cigarettes.

In one commonly used form of filter-cigarette manufacturing apparatus tobacco rod and filter plug rods are manipulated on fluted drums. These are generally very satisfactory for the handling of the articles but some difficulties can arise with increased production speeds owing to the problem of ensuring that each flute is supplied with an article.

It is an object of the present invention to provide an improved article feeding apparatus for feeding rod-like articles such as for example, filter plug rods which is particularly, although not exclusively, useful for feeding filter plug rods in the manufacture of filter tip cigarettes.

According to the present invention there is provided article feeding apparatus comprising a gravity-feed hopper for rod-like articles, a demand conveyor to receive articles from the hopper at a controlled and predictable rate, transfer means to support articles in the hopper and to deliver them in a stream from the hopper to the conveyor, and means to support some of the weight of articles in the hopper to relieve the transfer conveyor of some of their weight, wherein the transfer means constrains the articles to move in a single row transversely to their lengths and acts to urge them positively from the hopper to the demand conveyor. Preferably the demand conveyor is a fluted drum which, if the articles are cigarette filter plugs, may carry the plugs firstly to cutting apparatus to cut the multiple plug lengths to double or even single plug lengths and then to combining apparatus where the plug lengths are combined with tobacco rods to form filter cigarettes. The transfer means can comprise an endless band conveyor which can extend horizontally beneath a guide plate spaced therefrom by a distance such as to constrain the articles to move in a single row and in this case the conveyor is so arranged as to run at a faster speed than the articles are moving so as to slip under them, thereby positively urging them one against the other on to the demand conveyor.

Removal of the articles from the hopper is improved by fluidising the flow in the vicinity of the transfer conveyor to enable them to be jostled into position to form the single row in which they are transferred to the demand conveyor. (By "fluidising" where this expression is used herein is meant producing some relative motion between the articles and also some rolling movement of the articles.) To this end the hopper can be provided on the downstream side immediately above the conveyor with an upwardly extending friction band having an upwardly moving run exposed to articles in the hopper immediately above the conveyor. The opposite wall of the hopper can be stationary and can be shaped to improve the fluidising of the articles. This shape may be such as to define with the endless band a throat to restrict flow of the articles down the hopper, positioned somewhat above the transfer conveyor. In addition, a further throat can be provided upstream thereof and a relief chamber can be provided between the two throats to accommodate variations in the flows through the throats.

It is to be noted that the disclosure of the specification incorporates at least some of what is disclosed in U.S. patent application Ser. No. 708,928, filed Feb. 28, 1966, in the name of Horace Alexander Stone, and in Molins et al.'s copending application of even date.

An embodiment of the invention will now be described by way of example with reference to the single figure of the accompanying drawing, which is an elevation in section of apparatus for feeding multiple cigarette filter plug lengths to filter-cigarette manufacturing machinery.

Referring to the drawing, the apparatus shown comprises a hopper 1 for plugs 2 which are delivered in a single stream from the bottom of the hopper 1 by an endless band 3 running under a guide plate 4 to a fluted drum 5 which carries them to cutting apparatus and thence to further apparatus for combining the cut plugs with wrapped tobacco rods to form filter cigarettes.

The endless band 3 runs over a support plate 6 and is carried on rollers 7. Means 8 are provided to adjust the spacing of the endless band 3 and the support plate 6 from the guide plate 4 according to the nature and behavior of the plugs 2, as they move on to the drum 5.

The plugs 2 are supplied to the hopper 1 from trays and for this purpose the hopper 1 is constructed to have a mouth 9 at the top which is shaped to receive a tray so that plugs can be lowered directly out of the trays into the hopper 1. The further construction of the hopper 1 is designed to facilitate the delivery of the plugs 2 in a single stream. The hopper 1 comprises a downwardly sloping endless band conveyor 10 which supports the weight of some of the plugs and urges them to move across the hopper 1. Beneath the conveyor 10 there is a relief chamber 11 into which the plugs 2 are delivered through a flow-limiting throat 12, defined between a wall 13 of the hopper 1 and a projection 14 in a fixed member 15 which defines the relief chamber 11. The plugs 2 flow down from the relief chamber 11 along the upper side of a constriction member 16 which is adjustably mounted in the hopper wall by means of bolts 17 and which has a projection 18 which extends into the plug flow. On the other side of the hopper 1 between the chamber 11 and the guide plate 4 there is disposed an upwardly extending endless moving band 19 which defines with the projection 18 a further throat 20 through which the plugs 2 move into a fluidiser chamber 21 which acts to produce some relative movement between the plugs and some rolling movement of them, the bottom of the chamber 21 being, constituted by the band 3 which draws them out of the chamber. A cover plate 22 is adjustably secured to the fixed member 15 so as to be movable up and down the face of the belt 19 to vary the amount of the moving belt which is exposed to plugs in the hopper 1 so as to vary the fluidising effect of the belt 19 on the plugs 2. Thus, if the plugs 2 are plugs which have a relatively low mutual coefficient of friction, the cover plate 22 will be adjusted to an upper position so as to expose a large amount of the belt 19 and increase the fluidising force on the plugs 2. On the other hand, if the mutual coefficient of friction is high, then the cover plate 22 will be adjusted to a lower position, since a smaller force is required to bring about the necessary fluidisation, and excessive force may cause the plug movement to become uncontrolled and disorderly.

A bridge piece 24 is provided to support the plugs 2 between the end of the conveyor band 3 and the drum 5. All the bands 3, 10, and 19 are connected to a common drive which also drives the fluted drum 5 so that the speeds of these bands are varied in direct proportion to the speed of the fluted drum 5.

The operation of the apparatus is as follows. Plugs are fed into the hopper 1 through the mouth 9 from trays in which they are stacked, and moved downwardly through the hopper under the action of gravity towards the throat 12. Movement of the plugs 2 in the upper part of the hopper 1 is assisted by the endless band 10 which serves to move them across the hopper from the right-hand to the left-hand side and thereby to assist in maintaining the upper surface of the plugs more or less level. If this band 10 were not present there would be a tendency for plugs to pile up on the right hand side of the hopper, and for troughs to appear on the left hand side. This difference in height could lead to twisting and jamming of the plugs.

The throat 12 acts as a restriction of the plug flow, and so long as the downward pressure of plugs is more or less constant this will act as a metering device serving to feed an approximately constant flow of plugs into the relief chamber 11. The plugs move downwardly through the relief chamber 11 under the action of gravity through the throat 20 and in general the rate of flow through the throat 20 will be the same as the rate of flow through the throat 12. However, any difference in these flow rates is accommodated by the relief chamber 11 which acts as a small local reservoir, as the level of plugs in the chamber 11 can rise and fall. Once past the throat 20 and in the fluidiser chamber 21, the plugs are subjected to a number of forces which tend to give them a more or less circular movement as is indicated by the dotted arrow. Thus there is a downward force acting on the plugs arising from their own weight and from the weight of the stack of plugs above them, there is a horizontal force exerted by the endless band 3, and an upward force exerted by the refuser roller 23 and the band 19. The combined effect of all these forces is that the plugs are fluidised, enabling them to jostle themselves into position to form the single row, that is to say, that some relative movement between the plugs and some rolling movement of the plugs occurs. It should at this point be noted that one effect of the throats 12 and 20, and of the upwardly moving band 19, is to tend to take the weight of the stack of plugs in the hopper off the lowermost plugs in the fluidiser chamber 21, thus enabling those lowermost plugs to undergo relative movement. If these lowermost plugs had to support the whole weight of the stack then it would be difficult to fluidise them and they would tend to jam. Once in the chamber 21, the plugs move in one of two directons; either they are carried out of the chamber on the endless band 3 and under the guide 4 to be pushed into the flutes of the fiuted drum 5, or alternatively they are carried upwardly by the band 19 either to recirculate in the fluidiser chamber 21 or to pass back through the throat 20 into the relief chamber 11. Thus there is some flow in two directions through the throat 20. The adjusting means 8 are set so that there is some slight compression on the plugs lying between the conveyor band 3 and the guide plate 4, and at the same time the band 3 is run at a speed such that it slips under this line of plugs. Thus there is a considerable horizontal force acting on the line of plugs tending to push them along sideways and so gaps are unlikely to occur between the plugs. At the same time no bridging can occur since the width of the passage defined between the guide plate 4 and the conveyor band 3 is such that only one plug can pass at a time. As each flute of the fluted drum 5 comes into the appropriate position, so a plug from the line jumps into it and the line moves along slightly. It is found in practice that with this arrangement it is very rare for a flute of the drum 5 not to receive a plug.

This apparatus is particularly suitable for feeding plugs at high speed since one of the difficulties of doing this is that of getting the plugs into a rotating fluted drum in such a way that every flute of the drum receives a plug. The apparatus shown can comprise a part of a filter cigarete manufacturing machine, for example a machine operating in conjunction with a continuous rod cigarete-making machine. In such apparatus it is important that the feed of plugs should be continuous without gaps, since the effect of gaps is to cause wastage and may possibly lead to uncombined tobacco rods fouling subsequent parts of the machinery.

What we claim as our invention and desire to secure by Letters Patent is:

1. Apparatus for feeding rod-like articles comprising a gravity-feed hopper, a demand conveyor to receive articles in succession from the hopper at at controlled and predetermined rate, transfer means to support articles in the hopper and to deliver them in a stream drom the hopper to the conveyor, and means to support a portion of the total weight of articles in the hopper to relieve the transfer means of some of said weight, said transfer means including means to constrain the articles in said stream to move in a single row transversely to their lengths and positively driven means to urge them from the hopper to the demand conveyor.

2. Apparatus according to claim 1 wherein the demand conveyor is a rotatably mounted fluited drum.

3. Apparatus according to claim 1 wherein the transfer means comprises an endless band conveyor extending horizontally and said means to constrain said articles comprises a guide plate spaced from the surface of said endless band by a distance such as to cause compression of the article lying therebetween, said apparatus including means to drive said conveyor at a faster speed than the articles are moving so as to slip under them thereby urging them one against the other on to the demand conveyor.

4. Apparatus according to claim 1 wherein means are provided to fluidise the flow of articles in the hopper in the vicinity of the transfer conveyor to enable them to be jostled into position to form the single row in which they are transferred to the demand conveyor.

5. Apparatus according to claim 4 wherein the hopper is provided on the downstream side immediately above the transfer means with an upwardly extending friction band having a run capable of being driven upwardly exposed to articles in the hopper immediately above the conveyor.

6. Apparatus according to claim 5 wherein the wall of the hopper opposite the friction band is a stationary wall and is shaped to facilitate fluidising of the articles.

7. Apparatus according to claims 6 wherein said wal is shapeld to define with the endless band a throat to restrict flow of the articles down the hopper which throat is positioned above the transfer conveyor.

8. Apparatus according to claim 7 wherein means is provided for forming a further throat in the hopper upstream of the first mentioned throat and a relief chamber is provided between the two throats to accommodate variations in the flows through the throats.

9. Apparatus according to claim 8 wherein said means forming said further throat comprises a further endless band conveyor forming a part of one wall of said hopper and a stationary wall of said hopper opposite said further endless band conveyor.

10. Apparatus according to claim 8 wherein said two throats are in staggered relationship with respect to said transfer means whereby said articles follow a circuitous path while traveling downwardly through said hopper.

References Cited
UNITED STATES PATENTS

| | | | |
|---|---|---|---|
| 3,305,128 | 2/1967 | Dearsley | 198—62 |
| 3,355,004 | 11/1967 | Rupert | 198—53 |

RICHARD E. AEGERTER, Primary Examiner

U.S. Cl. X.R.

198—62